United States Patent [19]

Sudler et al.

[11] 4,340,828
[45] Jul. 20, 1982

[54] SINGLE PHASE STEPPING MOTOR

[75] Inventors: Roland Sudler, Frankfurt; Jean-Francois Schwab, Schwalbach, both of Fed. Rep. of Germany

[73] Assignee: Quarz-Zeit AG, Frankfurt am Main, Fed. Rep. of Germany

[21] Appl. No.: 130,394

[22] Filed: Mar. 14, 1980

Related U.S. Application Data

[63] Continuation of Ser. No. 875,789, Feb. 7, 1978, abandoned.

[30] Foreign Application Priority Data

Feb. 11, 1977 [DE] Fed. Rep. of Germany ....... 2705684

[51] Int. Cl.³ ............................................. H02K 37/00
[52] U.S. Cl. .................................................. 310/49 R
[58] Field of Search ......................... 310/49, 162–165, 310/268

[56] References Cited

U.S. PATENT DOCUMENTS 2,546,729  3/1951  De Millar .......................... 310/49 X Primary Examiner—Donovan F. Duggan
Attorney, Agent, or Firm—Martin A. Farber

[57] ABSTRACT

A single phase stepping motor, particularly for clocks, with a rotor having several pole teeth and a stator, the latter being made of two stator parts connected with one another via a bridge part, the latter carrying the excitation winding, of which each stator part on its free end has an equal or smaller number (in comparison to the rotor pole number) of stator pole teeth as well as a passage opening for the rotor shaft, the stator pole teeth being directed towards the face sides of the rotor. Each rotor pole tooth comprises a main pole and an auxiliary pole extending in the direction of rotation formed on the main pole, and between the stator pole teeth, a permanent magnetic circuit is provided, by means of which circuit the rest position of the rotor is determined during the unexcited stator condition.

13 Claims, 3 Drawing Figures

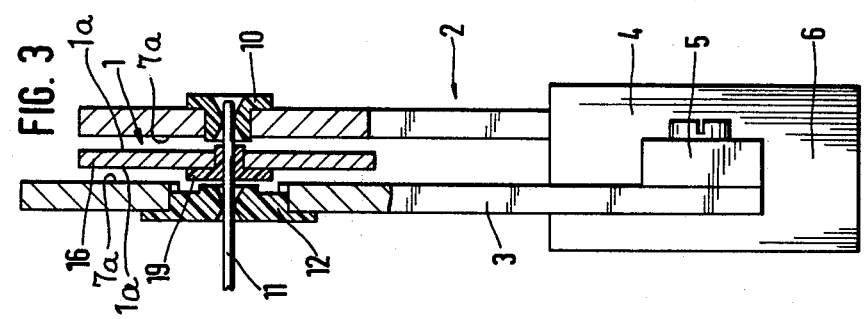
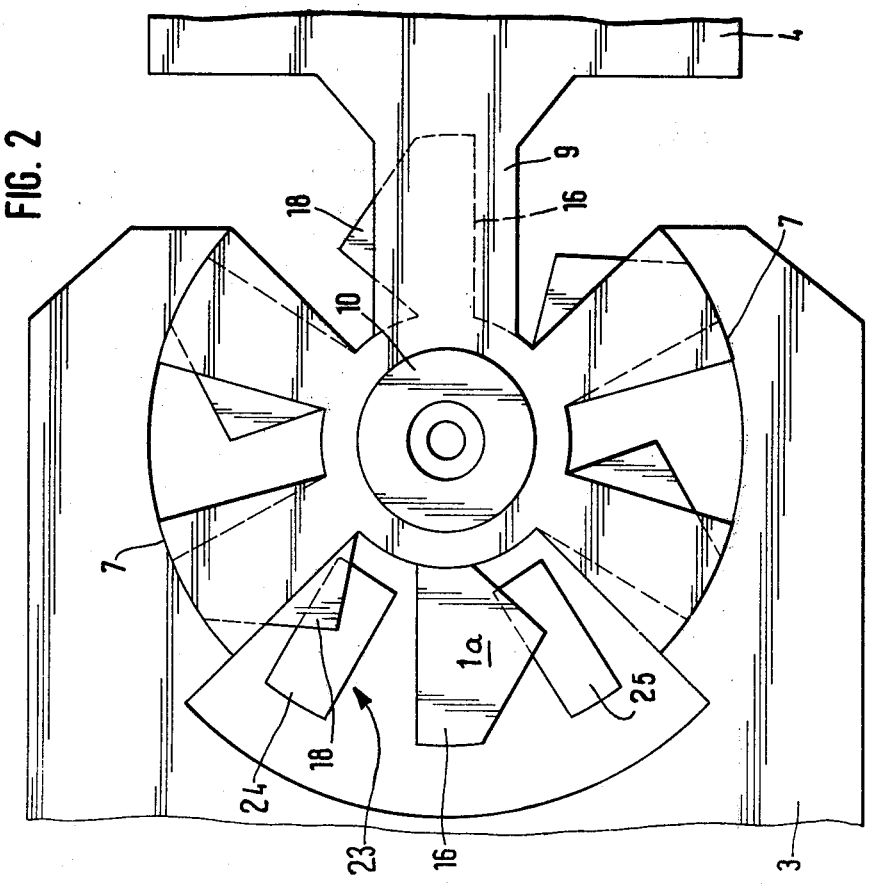

SINGLE PHASE STEPPING MOTOR

This is a continuation of application Ser. No. 875,789, filed Feb. 7, 1978 now abandoned.

The invention relates to a single phase stepping motor, particularly for clocks, with a rotor having several pole teeth and a stator, the latter being made of two stator parts connected with one another via a bridge part, the latter carrying the excitation winding, of which each stator part has on its free end an equal or smaller number (in comparison to the rotor pole number) of stator pole teeth as well as a passage opening for the rotor shaft, the stator pole teeth being directed toward the face sides of the rotor.

One phase stepping motors of this type are already known, by which on the two stator parts, which comprise a high permeable material, there are arranged respectively pole pieces made of pure iron. In the circumferential direction the pole pieces have different heights or levels, whereby main poles and auxiliary poles are formed. The rotor comprises a disc made of a platinum-cobalt alloy with a number of teeth, which respectively are magnetized in the axial direction. The toothed rotor disc rotates between the pole pieces, which pole pieces project from the stator parts towards the face surfaces of the rotor disc. Such type of single phase stepping motors have the advantage that on the basis of the comparatively small air gap between the poles which are axially opposite one another, they have a very small energy consumption and a very high efficiency with small construction volumes.

It is an object of the present invention to further improve these single phase stepping motors with respect to their energy consumption, their efficiency and their construction volumes.

This object is aided in accordance with another object of the invention in the manner that each rotor pole tooth radially overlaps the axial directed sides of the stator pole teeth and comprises a main pole (16) and an auxiliary pole (18) extending in the direction of rotation and formed on the main pole, and between the stator pole teeth (7) there is provided a permanent magnetic circuit (13) by means of which circuit the rest position of the rotor (1) is determined or defined with an unexcited stator.

By this measure, with respect to the known single phase stepping motors, the air gap between the stator poles, which poles are opposite one another across the rotor pole teeth, is allowed to be substantially reduced, whereby the efficiency is permitted to increase and the energy consumption is allowed to be reduced. Moreover in this manner the construction height of the motor is reduced. Since for the rotor no permanent magnetic material is required, instead this can be made of a soft magnetic material (or low retentive material) by stamping or punching out from a sheet metal, and a complicated axial magnetizing of the rotor, as is required with the known motors is completely unnecessary and eliminated. This and the possible use of a stampable material for the rotor considerably simplifies and reduces the price of production of the motor. A particular advantage of the invention resides in that the rotor can be executed substantially thinner than with the known motors, which results in a lower moment of inertia of the rotor and consequently a reduction of the current consumption. A further particular advantage of the single phase stepping motor in accordance with the invention resides in that its direction of rotation simply can be changed by reversed use or insertion of the rotor in its bearing or mounting. By the unipolar control of the motor a further reduction of the current consumption may be achieved, completely aside from the fact that thereby a protection against confusing of the poles can be eliminated and simplifications occur in the control circuit of the motor. Finally, and this is a further special advantage of the motor in accordance with the invention, alone and independent of the parameters of the motor, the holding moment can be changed by variation of the field strength or intensity of the permanent magnetic circuit.

According to one embodiment of the invention the stator pole teeth (7) are formed circularly annular sector-shaped and the rotor has rectangular shaped main poles (16), each of which main poles transfer or pass at a radial limit line into a triangularly-shaped auxiliary pole (18). As it has been shown, with such a motor construction, a particularly favorable efficiency and energy consumption can be achieved with a small construction height or level. A further improvement of these values can be achieved in the manner that the narrow or short side of each rectangular-shaped main pole (16) is approximately equal to the width of a stator pole tooth (7) in the range of the base or foot of the main pole.

A further extensive increase in the efficiency can be achieved in the manner that the stator parts (3, 4, 5) are made of a soft magnetic material (or low retentive material) of low coercive force or retentivity. With the materials, known under the trade names Hyperm, Hyperm 766, Hyperm 800, Hyperm 900 and Hyperm Max., advantageous results could be achieved. These materials are deformable or workable cold so that the stator parts with the main- and auxiliary-poles can be stamped out.

According to one embodiment of the invention the permanent magnetic circuit (13) comprises 2 n (n = 1, 2, 3 . . . m) permanent magnets (14), n of which point with its north pole and the others point with its south pole toward the rotor (1). It was shown that in general two permanent magnets suffice for the construction of the magnetic circuit.

A still advantageous embodiment with respect to its production costs resides in the permanent magnet circuit (13) comprising at least one permanent magnet (14) and a return plate (15) arranged on its side turned away from the rotor (1), the free end of which is offset or displaced with respect to the permanent magnet (14) by at least the angle α of two adjacent rotor poles (10).

It has proven advantageous, in order to achieve a smallest possible construction height or level of the motor to use permanent magnets made of a lanthanide-ferromagnetic alloy. Such type of alloys have a particularly high energy product (BH) max., so that permanent magnets made of this material can be held very small.

In order to eliminate undesired secondary flux from one stator part to the other stator part (such a secondary flux would lead to a substantial impairment of the efficiency and increase of the energy consumption under circumstances), an embodiment form is recommended by which the stator pole teeth (7) which are associated with one stator part (3) on its end remote or turned away from the rotor axis sit on the stator part (3), and the stator pole teeth (7) which are associated with the other stator part (4) sit on a ring (8), which ring is connected with the stator part (4) by means of a stay (9).

A further reduction of the energy consumption of the motor can be achieved by the use of a rotor with a highest possible number of main- and auxiliary-poles. Namely, the higher the number of the rotor poles, the smaller the angle of rotation with each step and the lower can the energy content of the control pulses be. It has proven particularly advantageous to construct the rotor with 60 poles and the stator with a smaller pole number. A so formed motor not only has a most extremely low energy consumption, but beyond that also still has the advantage that since the rotor rotates with a second step, the rotor shaft can be used directly as a seconds shaft. On the basis of functional efficiency it can be suitable to form the stator 10 polar, since with a higher polar stator, the formation of the individual poles can lead to certain difficulties.

With the above and other objects and advantages in view, the present invention will become more clearly understood in connection with the following detailed description of a preferred embodiment, when considered with the accompanying drawings, of which:

FIG. 2 is a plan view of another embodiment showing the part of the single phase stepping motor according to FIG. 1, which contains the rotor; and FIG. 3 is a side view of the single phase stepping motor according to FIG. 1, partially in section; each in substantially enlarged illustration.

Figure 1:
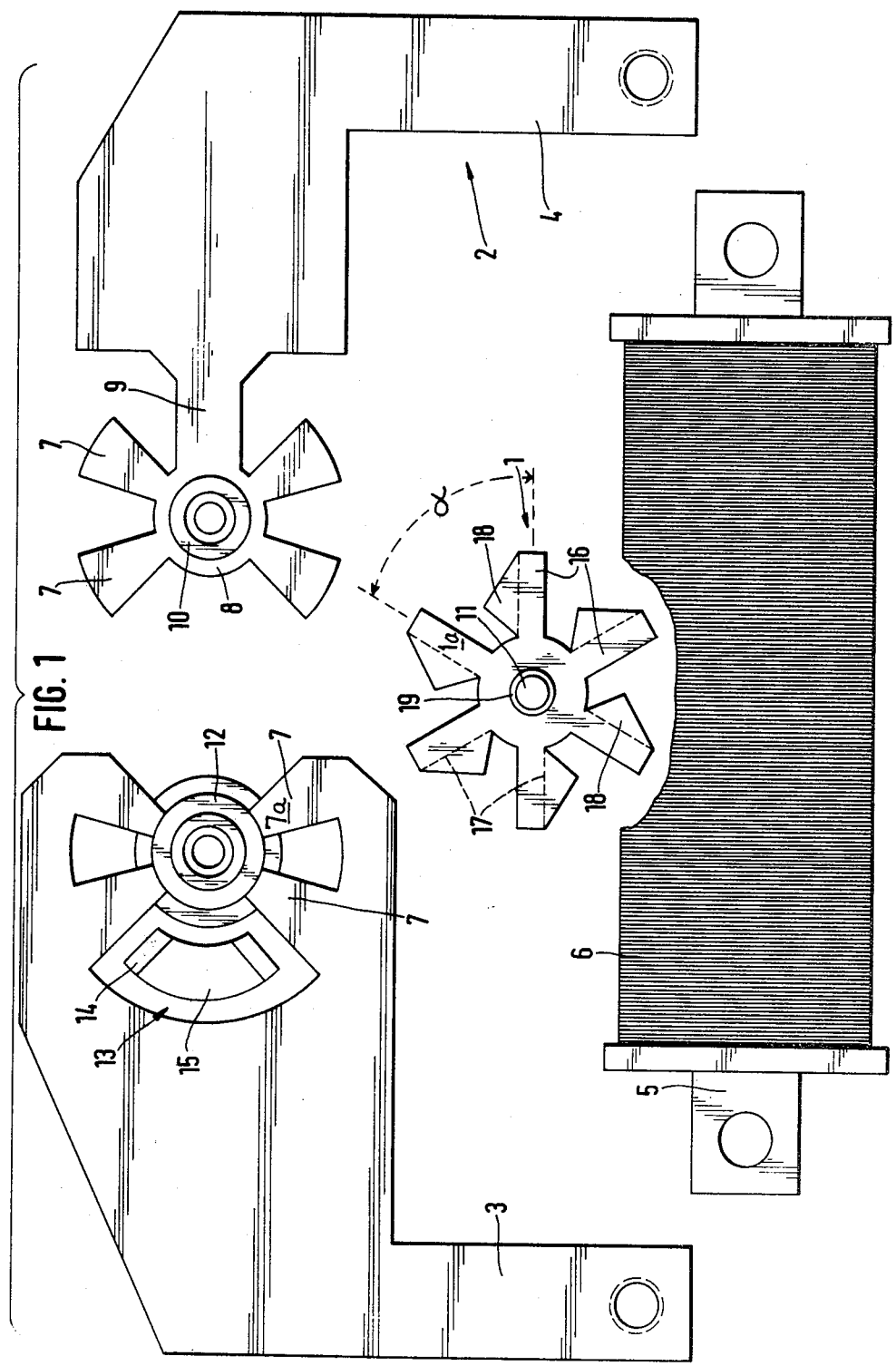
FIG. 1 is an exploded illustration of a single phase stepping motor with a four polar stator and a six polar rotor.

Referring now to the drawings, a single phase stepping motor in accordance with the present invention comprises a six polar rotor 1 and a stator 2, the latter comprising two stator parts 3 and 4 as well as a bridge part 5 connecting these two parts with the excitation coil 6.

Each stator part 3 and 4, respectively, carries on its end adjacent to the rotor 1 four annular sector shaped stator pole teeth 7, of which the four stator pole teeth 7 of the stator part 3 with their end remote from the rotor axis sit on the stator part and the other four stator pole teeth 7 of the stator part 4 sit on a ring 8 which is concentric to the rotor axis, the ring 8 being connected with the stator part 4 proper by means of a stay 9. A synthetic or plastic material bushing or socket 10 is pressed in the ring 8 for mounting of the rotor shaft 11 therethrough. The rotor shaft 11 also rotatably passes though an additional synthetic material or plastic bushing 12, the latter being held by the inner free ends of the pole teeth 7 of the stator part 3, which inner free ends of the pole teeth 7 project toward the axis of rotor. The stator parts 3 and 4 each form an integral unit respectively with the stator pole teeth 7 associated therewith, which likewise as the bridge part 5 are produced by stamping out or punching out from a Hyperm-766 plate or sheet metal.

In a recess in the stator part 3 these is disposed a permanent magnetic circuit 13, which comprises a permanent magnet 14 made of a lanthamide-ferromagnetic alloy and a return plate or sheet 15 made of soft iron, on one end of which the magnet 14 is disposed. The other end 20 of the return plate 15 is bent upwardly against the rotor 1 and displaced with respect to the one end by the angle α. The permanent magnetic circuit 13 is fastened on a carrier plate (not shown) on which the stator 2 is also mounted.

Instead of the magnetic circuit 13 there is shown in FIG. 2 a permanent magnetic circuit 23 which consists of two permanent magnetic 24 and 25 displaced with respect to one another by an angle α. The permanent magnetic 24 and 25 are disposed on the carrier plate (not shown) in such manner that the north pole of the magnet 24 and the south pole of the magnet 25 or vice versa are adjacent to the rotor 1.

The rotor 1, which likewise is stamped out or punched out from a Hyperm-766 plate or sheet metal is made of six substantially rectangular-shaped main poles 16, which main poles each transfers at a substantially radial limit line 17 into a triangular-shaped auxiliary pole 8, the main poles 16 and auxiliary poles 18 constituting rotor pole teeth. Each rotor pole tooth has axially directed or axially facing (lateral) sides 1a which radially overlap and axially face the corresponding axially facing sides 7a of the stator pole teeth 7. As particularly shown in FIG. 2, the narrow side of each main pole 16 is selected equal to the width of a stator pole tooth 7 in the range of the base or foot of the main pole. The rotor plate is mounted on a synthetic material bushing 19, the latter in turn being forced or pressed on a rotor shaft 11. The magnetic field of the permanent magnetic circuit 13 closes across said rotor poles and produces alternating magnet poles on the rotor poles.

In the excited condition the main poles 16 of the rotor 1 are located between the stator poles 7, in the manner where the auxiliary poles 18 project out of the range of the stator poles 7. This excitation condition is illustrated in FIG. 2. As soon as the excitation current through the coil decreases and approaches zero, or becomes zero, the two main poles 16, whose auxiliarly poles 18 thereof lie in the range of the permanent magnets 14 and 25 in the excited condition, are drawn by the permanent magnetic field into a position in which they cover the permanent magnets 24 and 25. The magnetic circuit thus has its lowest magnetic resistance. In this position the auxiliary poles 18 project between the opposite stator poles 7 of the respective stator parts 2 and 3 so that when the excitation is again effective or operative, the main poles 16 are drawn between the opposite stator poles of the respective stator parts 2 and 3 by the auxiliary poles.

It may be pointed out that the permanent magnets of the magnetic circuit can be arranged in the plane of the stator part as well as also in that of the other stator part or also alternating in both planes. Correspondingly the same applies for a magnetic circuit containing a return plate concerning the free end of the return plate and of the permanent magnet.

For appreciation of the actual dimensions of such a type of motor which is laid out or rated for an operating voltage of less than or equal to 1.5 volts, the following attainable dimensions may be stated: length approximately 9 mm, width approximately 5 mm and height approximately 3 mm.

While there has been disclosed embodiments of the present invention, it is to be understood that these embodiments all given by example only and not in a limiting sense.

We claim:

1. In a single phase stepping motor, particularly for clocks, with a rotor having several pole teeth and a stator, the latter being made of two stator parts connected with one another via a bridge part, the latter carrying the excitation winding, of which each stator part has on its free end and equal or smaller number (in comparison to the rotor pole number) of the stator pole teeth as well as a passage opening for the rotor shaft, the stator pole teeth being directed towards the face sides of the rotor, the improvement wherein
said rotor and said stator parts are made of an unmagnetized soft magnetic material of low retentivity,
each rotor pole tooth substantially radially overlaps axial facing sides of the stator pole teeth in positions of the rotor and comprises a main pole and an auxiliary pole, the latter extending in a direction of rotation and formed on said main pole,
a permanent magnetic circuit means disposed between the stator pole teeth for determining a rest position of the rotor with the stator unexcited and for producing alternating poles of said rotor, the rotor poles being unmagnetized by the excitation winding, the field lines of said permanent magnetic circuit means close across said rotor poles.

2. The single phase stepping motor as set forth in claim 1, wherein
said stator pole teeth are formed annular sector shaped and said rotor has rectangular shaped main poles,
each of said main poles defines a substantially radial limit line, said main poles each transfer on said radial limit line into a triangular-shaped auxiliary pole.

3. The single phase stepping motor as set forth in claim 2, wherein
each of said rectangular shaped main poles has a narrow side, each of said main poles also defines a base portion, said narrow side is approximately equal to the width of said stator pole teeth, respectively, in a range of said base portion of said main pole.

4. In a single phase stepping motor, particularly for clocks, with a rotor having several pole teeth and a stator, the latter being made of two stator parts connected with one another via a bridge part, the latter carrying the excitation winding, of which each stator part has on its free end an equal or smaller number (in comparison to the rotor pole number) of stator pole teeth as well as a passage opening for the rotor shaft, the stator pole teeth being directed towards the face sides of the rotor, the improvement wherein
said rotor and said stator parts are made of an unmagnetized soft magnetic material of low retentivity,
each rotor pole tooth substantially radially overlaps face sides of the stator pole teeth in positions of the rotor and comprises a main pole and an auxiliary pole, the latter extending in a direction of rotation and formed on said main pole,
a permanent magnetic circuit means disposed between the stator pole teeth for determining a rest position of the rotor with the stator unexcited and for producing alternating poles of said rotor, the rotor poles being unmagnetized by the excitation winding, the field lines of said permanent magnetic circuit means close across said rotor poles,
said permanent magnetic circuit means comprises 2 n (n = 1, 2, 3 . . . m) permanent magnets, said permanent magnets each have a south pole and a north pole, respectively, n of said permanent magnets point to said rotor with said north poles thereof, respectively, and the others of said permanent magnets points to said rotor with said south poles thereof, respectively.

5. In a single phase stepping motor, particularly for clocks, with a rotor having several pole teeth and a stator, the latter being made of two stator parts connected with one another via a bridge part, the latter carrying the excitation winding, of which each stator part has on its free end an equal or smaller number (in comparison to the rotor pole number) of stator pole teeth as well as a passage opening for the rotor shaft, the stator pole teeth being directed towards the face sides of the rotor, the improvement wherein
said rotor and said stator parts are made of an unmagnetized soft magnetic material of low retentivity,
each rotor pole tooth substantially radially overlaps face sides of the stator pole teeth in positions of the rotor and comprises a main pole and an auxiliary pole, the latter extending in a direction of rotation and formed on said main pole,
a permanent magnetic circuit means disposed between the stator pole teeth for determining a rest position of the rotor with the stator unexcited and for producing alternating poles of said rotor, the rotor poles being unmagnetized by the excitation winding, the field lines of said permanent magnetic circuit means close across said rotor poles,
said permanent magnetic circuit means is made of at least one permanent magnet and a return plate, said at least one permanent magnet has a side thereof facing away from said rotor, said return plate is arranged on said side of said at least one permanent magnet facing away from said rotor, said return plate has a free end displaced relative to said at least one permanent magnet by at least an angle $\alpha$ of two adjacent of said rotor poles.

6. The single phase stepping motor as set forth in claim 4, wherein
said at least one permanent magnet is made of a lanthanide-ferromagnetic alloy.

7. The single phase stepping motor as set forth in claim 1, 5 or 6, wherein
said stator pole teeth associated with one of said stator parts have an end pointing away from the axis of said rotor, said stator pole teeth of said one stator part are seated on said end on said stator part,
a ring concentric to said rotor axle,
a stay connects said ring with the other of said stator parts,
said stator pole teeth of said other stator part are seated on said ring.

8. The single phase stepping motor as set forth in claim 1, 5 or 6, wherein
said rotor is formed 60 polar and said stator is formed with a smaller number of poles.

9. The single phase stepping motor as set forth in claim 8, wherein
said stator is formed 10 polar.

10. The single phase stepping motor as set forth in claims, 1, 4 or 5, wherein
said permanent magnet circuit means comprises two magnets disposed between two adjacent of said stator pole teeth of said each stator part, said two magnets have magnet poles spaced apart from one another approximately by the spacing of two adjacent said main poles of said rotor and substantially radially aligned corresponding to said two adjacent main poles.

11. The single phase stepping motor as set forth in claim 10 wherein
said magnets and poles being arranged such that in a rest position with unexcited excitation winding said two adjacent main poles are disposed over said magnet poles with the auxiliary poles projecting in the range of the stator poles, whereby during excitation of the excitation winding the main poles are drawn by the auxiliary poles into the range of the stator poles with the auxiliary poles then projecting out of the range of the stator poles and some of said auxiliary poles projecting into the range of said magnet poles, whereby the latter auxiliary poles draw said rotor poles into the rest position upon deexcitation of the excitation winding.

12. The single phase stepping motor as set forth in claim 1, wherein
said stator pole teeth of each of said stator parts are respectively axially spaced from each other,
said rotor is rotatably axially disposed between the stator pole teeth of the two stator parts.

13. The single phase stepping motor as set forth in claim 12, wherein
said rotor and said stator parts are plate-like thin.

* * * * *